US009137438B2

(12) United States Patent
Erhart et al.

(10) Patent No.: US 9,137,438 B2
(45) Date of Patent: Sep. 15, 2015

(54) BIOMETRIC OBJECT SENSOR AND METHOD

(71) Applicant: Synaptics Incorporated, San Jose, CA (US)

(72) Inventors: Richard Alexander Erhart, Tempe, AZ (US); Erik Jonathon Thompson, Phoenix, AZ (US); Jaswinder Jandu, Chandler, AZ (US); Pamela Percy, Tempe, AZ (US)

(73) Assignee: Synaptics Incorporated, San Jose, CA (US)

( * ) Notice: Subject to any disclaimer, the term of this patent is extended or adjusted under 35 U.S.C. 154(b) by 219 days.

(21) Appl. No.: 13/763,377

(22) Filed: Feb. 8, 2013

(65) Prior Publication Data

US 2013/0258086 A1    Oct. 3, 2013

Related U.S. Application Data

(60) Provisional application No. 61/616,112, filed on Mar. 27, 2012.

(51) Int. Cl.
  G06K 9/00    (2006.01)
  H04N 5/232   (2006.01)
  G06K 9/20    (2006.01)

(52) U.S. Cl.
  CPC ........ *H04N 5/23219* (2013.01); *G06K 9/00033* (2013.01); *G06K 9/00899* (2013.01); *G06K 9/2018* (2013.01)

(58) Field of Classification Search
  CPC ...................................................... G06K 9/00

USPC ......................................................... 382/115
See application file for complete search history.

(56) References Cited

U.S. PATENT DOCUMENTS

| 4,151,512 A | 4/1979 | Rigannati et al. |
| 4,225,850 A | 9/1980 | Chang et al. |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Stephen R Koziol
*Assistant Examiner* — Delomia Gilliard
(74) *Attorney, Agent, or Firm* — Leydig, Voit & Mayer, Ltd.

(57) ABSTRACT

A biometric image sensor system and method is disclosed which may comprise a first light source having a first wavelength $\lambda_1$, a second light source having a second wavelength $\lambda_2$, a photodetector configured and positioned to receive light of the first wavelength $\lambda_1$ and light of the second wavelength $\lambda_2$ reflecting from a biometric object being imaged and to produce a first output indicative of the amount of reflectance of the light of the first wavelength $\lambda_1$ and a second output indicative of the amount of reflectance of the light of the second wavelength $\lambda_2$, and a computing device configured to compare the difference between the first output and the second output with an authenticity threshold.

28 Claims, 2 Drawing Sheets

(56) References Cited

U.S. PATENT DOCUMENTS

| | | |
|---|---|---|
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Loftberg |
| 4,675,544 A | 6/1987 | Shrenk |
| 4,758,622 A | 7/1988 | Gosselin |
| 4,817,183 A | 3/1989 | Sparrow |
| 5,076,566 A | 12/1991 | Kriegel |
| 5,088,817 A | 2/1992 | Igaki et al. |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,330,345 B1 | 12/2001 | Russo et al. |
| 6,332,193 B1 | 12/2001 | Glass et al. |
| 6,333,989 B1 | 12/2001 | Borza |
| 6,337,919 B1 | 1/2002 | Duton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,459,804 B2 | 10/2002 | Mainguet |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |

(56) References Cited

U.S. PATENT DOCUMENTS

| | | |
|---|---|---|
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujieda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,046 B2 | 10/2011 | Franza et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,181,031 B2 | 5/2012 | Narayanaswami |
| 8,204,281 B2 | 6/2012 | Satyan et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson et al. |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,616,451 B1 | 12/2013 | Rao |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0044051 A1 | 3/2003 | Fujieda |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0001711 A1 | 1/2005 | Doughty et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |

(56) References Cited

U.S. PATENT DOCUMENTS

| | | |
|---|---|---|
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perreault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0089605 A1* | 4/2008 | Haven .................... 382/275 |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0247607 A1* | 10/2008 | Amano ................... 382/115 |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0075631 A1 | 3/2010 | Black et al. |
| 2010/0083000 A1 | 4/2010 | Kesanupalli et al. |
| 2010/0110170 A1* | 5/2010 | Bringer et al. .................. 348/77 |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0082791 A1 | 4/2011 | Baghdasaryan et al. |
| 2011/0083018 A1 | 4/2011 | Kesanupalli et al. |
| 2011/0083170 A1 | 4/2011 | Kesanupalli et al. |
| 2011/0083173 A1 | 4/2011 | Baghdasaryan et al. |
| 2011/0090047 A1 | 4/2011 | Patel |
| 2011/0102137 A1* | 5/2011 | Schroter .................... 340/5.52 |
| 2011/0102567 A1 | 5/2011 | Erhart |
| 2011/0102569 A1 | 5/2011 | Erhart |
| 2011/0134251 A1 | 6/2011 | Kim et al. |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0062364 A1* | 3/2012 | Rowe et al. .................... 340/5.82 |
| 2012/0189166 A1 | 7/2012 | Russo |
| 2012/0189172 A1 | 7/2012 | Russo |
| 2012/0206586 A1 | 8/2012 | Gardner |
| 2012/0230551 A1* | 9/2012 | Hama et al. .................... 382/115 |
| 2012/0256280 A1 | 10/2012 | Ehart |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0094715 A1 | 4/2013 | Benkley et al. |
| 2013/0279768 A1 | 10/2013 | Boshra |
| 2014/0026208 A1 | 1/2014 | Coons |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |

(56) References Cited

FOREIGN PATENT DOCUMENTS

| | | |
|---|---|---|
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

"Bona fide, adv. and adj." OED Online. Oxford University Press, Jun. 2014. Web. Jul. 17, 2014.

Blackberry. 2002. Research in Motion Limited, Waterloo, Ontario, Canada.

Droid. 2009. Lucasfilm Ltd., San Francisco, CA, USA USA.

Drahansky, Liveness Detection in Biometrics, Advanced Biometrics Technologies, 179-199 (Aug. 9, 2011).

* cited by examiner

FIG. 6

BIOMETRIC OBJECT SENSOR AND METHOD

CROSS-REFERENCE

This application claims the benefit of U.S. Provisional Application No. 61/616,112, filed Mar. 27, 2012, which application is incorporated herein by reference.

BACKGROUND OF THE INVENTION

In the field of biometric sensors, such as fingerprint sensors, efforts are made to fool of "spoof" an image sensor/collector and image producing system and method, e.g., by forming a fake finger, such as out of a material like so-called "silly putty" and forming on the fake finger an image of a fingerprint in an effort to falsely obtain access to an electronic device protected by a biometric image sensor and comparison system and method. There exists in the art a need for a system and method for authenticating that the biometric object being imaged for comparison is, in fact, part of a human body from which the biometric sensor is detecting the image.

One example of a fingerprint swipe sensor is described in U.S. Pat. No. 6,289,114 entitled FINGERPRINT-READING SYSTEM. This patent describes a system in which the surface area of the sensor is far smaller than the surface area of the fingerprint to be read. The reading is done when the sensor and the finger are in contact and in a relative motion of sliding of the sensor and the finger with respect to each other. The system reconstitutes a complete image of the fingerprint from the partial images given by the sensor during this motion, utilizing pressure and/or temperature from the finger being sensed. The manner in which the system reconstitutes a complete image of the fingerprint from the partial images given by the sensor is not described. Another example of a swiped sensor utilizing capacitive coupling through features of the biometric being imaged, e.g., fingerprint ridges and valleys can be found in U.S. Pat. No. 7,099,496, entitled SWIPED APERTURE CAPACITIVE FINGERPRINT SENSING SYSTEMS AND METHODS.

As discussed in U.S. Pat. No. 5,940,526 to Setlak et al., issued on Aug. 17, 1999, entitled, ELECTRIC FIELD FINGERPRINT SENSOR HAVING ENHANCED FEATURES AND RELATED METHODS, an integrated circuit fingerprint sensor including an array of RF sensing electrodes can provide an image of the fingerprint ridges and valleys. The RF sensing permits imaging of live tissue, including just below the surface of the skin, and in that sense itself is a primative form of reducing spoofing. Setlak et al. is incorporated herein by reference.

SUMMARY OF THE INVENTION

A biometric image sensor system and method is disclosed which may comprise a first light source having a first wavelength $\lambda_1$, a second light source having a second wavelength $\lambda_2$, a photodetector configured and positioned to receive light of the first wavelength $\lambda_1$ and light of the second wavelength $\lambda_2$ reflecting from a biometric object being imaged and to produce a first output indicative of the amount of reflectance of the light of the first wavelength $\lambda_1$ and a second output indicative of the amount of reflectance of the light of the second wavelength $\lambda_2$, and a computing device configured to compare the difference between the first output and the second output with an authenticity threshold. The biometric object may be a finger. The finger may be being imaged to obtain a fingerprint image. The wavelengths $\lambda_1$ and $\lambda_2$ may be selected to coincide with a section of relatively high change in the reflectance vs. wavelength curve for the biometric object. The biometric object may comprise human skin. The wavelength $\lambda 1$ may be in the visible range of yellow light and the wavelength $\lambda_2$ may be in the visible range of one of orange light and red light.

A biometric image sensor system and method is disclosed which may comprise one or more light sources wherein the one or more light sources is configurable to have a first wavelength $\lambda_1$, and a second wavelength $\lambda_2$, one or more photodetectors configurable and positionable to receive one or more electromagnetic radiation wavelengths reflected from a surface in response to the first wavelength $\lambda_1$ and the second wavelength $\lambda_2$ wherein the reflected electromagnetic radiation is reflecting from a biometric object being imaged to produce a first output indicative of the amount of reflectance of the light of the first wavelength $\lambda_1$ and a second output indicative of the amount of reflectance of the light of the second wavelength $\lambda_2$, and a computing device configured to compare the difference between the first output and the second output with an authenticity threshold. The biometric object may be a finger. The finger may be being imaged to obtain a fingerprint image. The wavelengths $\lambda_1$ and $\lambda_2$ may be selected to coincide with a section of relatively high change in the reflectance vs. wavelength curve for the biometric object. The biometric object may comprise human skin. The wavelength $\lambda 1$ may be in the visible range of yellow light and the wavelength $\lambda_2$ may be in the visible range of one of orange light and red light.

INCORPORATION BY REFERENCE

All publications, patents, and patent applications mentioned in this specification are herein incorporated by reference to the same extent as if each individual publication, patent, or patent application was specifically and individually indicated to be incorporated by reference, for all purposes, and to the same extent as if fully reproduced in the present application.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
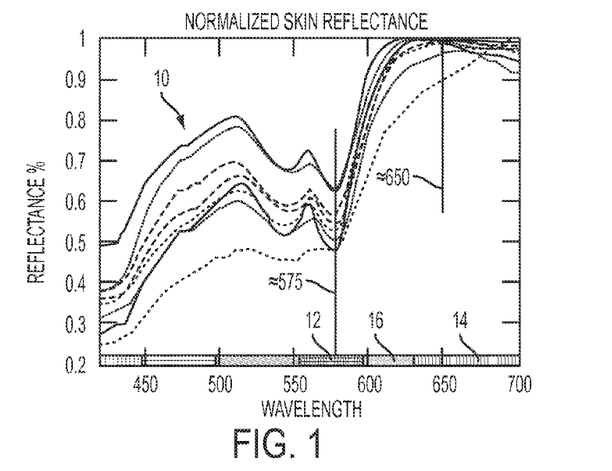
FIG. 1 illustrates a reflectivity vs. wavelength curve for a plurality of human fingers from different individuals.

Turning now to FIG. 1 there is shown a plurality of reflectivity vs. wavelength curves 10 for a plurality of human fingers from different individuals. It will be noted that, while reflectivities vary as much as about 10% to 20% between individuals, all human skin exhibits a relative steep rate of increase in reflectivity for wavelengths from about 575 in the yellow visible light range 12 to about 650 in the red visible light range 14, with the intervening orange visible light range 16. That is, the reflectivity (amount or percentage of reflectance) increases from about 45% to 60% to about 100%, i.e., the reflectance about doubles in this range of light wavelengths. It can be seen that a similar relatively steep increase occurs from the wavelengths of about 440-510, though not quite as pronounced an increase as for the 575-650 range, covering yellow light to red light and the intervening orange light.

Figure 2:
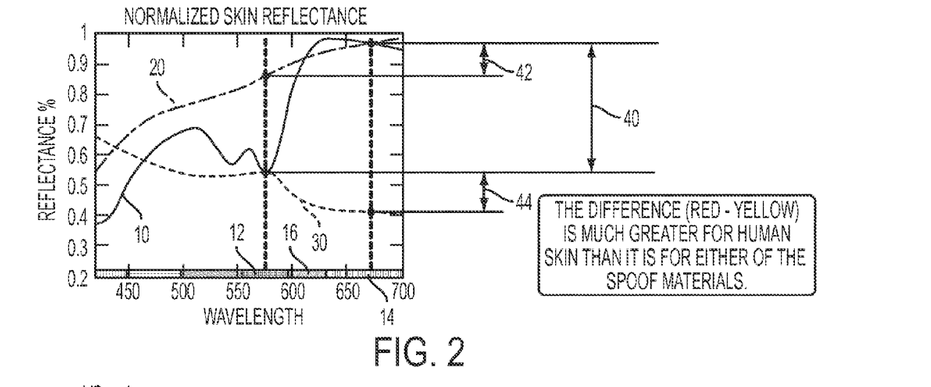
FIG. 2 illustrates the differences in reflectivity for "spoofing" materials that, e.g., generally increase in reflectivity as wavelength increases or decrease in reflectivity as wavelength increases.

Turning now to FIG. 2 there is illustrated the differences in reflectivity for "spoofing" materials that, e.g., as illustrated in curve 20 generally increase in reflectivity as wavelength increases or, as illustrated in curve 30 generally decrease in reflectivity as wavelength increases. As can be seen from the representative human finger response curve 10 in FIG. 2, a difference between the response to light in the yellow range 12, e.g., at about 575 nm wavelength, i.e., about 50% reflectivity and light in the red range, e.g., at about 675 nm, i.e., about 95% gives a difference of about 45%. On the other hand, the difference for the spoofing material A, i.e., on curve 20, is between about 83% and about 95% and the difference for the spoofing material B, i.e., curve 30 is between about 40% and 53%. Thus, the absolute value of the differences for the spoofing materials A, curve 20, and B, curve 30, at the noted wavelengths, is about one fourth the difference for actual human skin. Therefore, an authenticity threshold can be selected, such as greater than around a 1.5× ratio, being indicative of a reflection of the two wavelengths of light being from human skin, and less than the authenticity threshold not being a reflection of the two light wavelengths from human skin.

Figure 3:
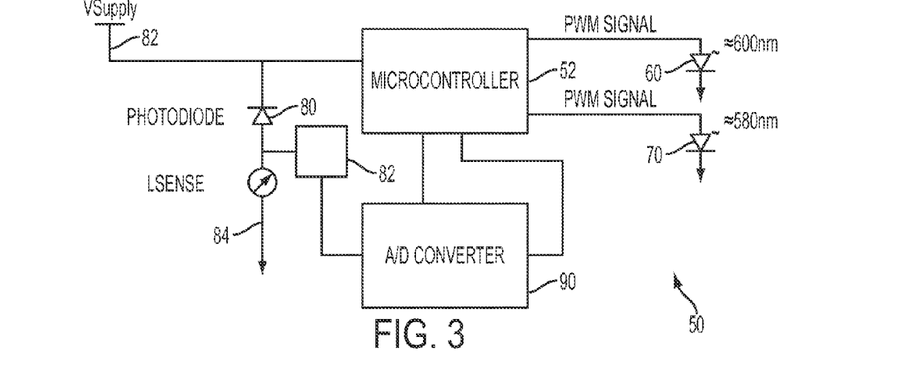
FIG. 3 shows in schematic and block diagram form a circuit for distinguishing between a "spoofing" material and a human finger being imaged.

FIG. 3 shows in schematic and block diagram form a circuit 50 for distinguishing between a "spoofing" material and a human finger being imaged. In an aspect of the disclosure, the circuit 50 can include a computing device, such as a microprocessor or microcontroller 52, that can serve to control one or more light sources, such as a pair of light sources comprising an orange or red light emitting diode ("LED") 60 and a yellow LED 70. The microprocessor 52 may control the one or more light sources, or different LEDs 60, 70 to be on at different times while a biometric object of a user is being sensed, such as when a user is swiping a finger over a fingerprint sensor as part of a fingerprint imaging system and method. In another aspect, the circuit 50 can include a computing device, such as a microprocessor or microcontroller 52, that can serve to control a single light source capable of delivering or emitting more than one frequency of light. The microprocessor 52 may control the light source to be on emit two or more wavelengths of light at different times while a biometric object of a user is being sensed, such as when a user is swiping a finger over a fingerprint sensor as part of a fingerprint imaging system and method. As will be appreciated by those skilled in the art, one or more sensors can be configured to be used with one or more light sources, and one or more microprocessors or microcontrollers to provide redundancy to the system if desired without departing from the scope of the disclosure. Additionally, the circuit 50 can further be combined with one or more additional biometric sensors, such as fingerprint swipe sensors described in U.S. Pat. No. 6,289,114.

The LEDs could be, e.g., Red, $610<\lambda<760$, Aluminium gallium arsenide (AlGaAs), Gallium arsenide phosphide (GaAsP), Aluminium gallium indium phosphide (AlGaInP), and Gallium(III) phosphide (GaP), Orange, $590<\lambda<610$, Gallium arsenide phosphide (GaAsP), Aluminium gallium indium phosphide (AlGaInP), Gallium(III) phosphide (GaP) and Yellow, $570<\lambda<590$, Gallium arsenide phosphide (GaAsP), Aluminium gallium indium phosphide (AlGaInP), and Gallium(III) phosphide (GaP) with suitable coating of a phosphor or scintillator. In other configurations a single light source capable of emitting two or more wavelengths can be used.

At the same time, a photodetector 80 may be attached to a voltage supply 82 causing a sensor current 84 to pass through the detector 80 which, e.g., accumulates charge from incident photons. The incident photons are being collected in the photodetector 80 and the photodetector 80 provides an analog output to an A/D converter 90, providing a digital output to the microprocessor 52. The digital output is alternatively representative of light of the respective wavelength from the respective yellow LED 70 and orange LED 60, as examples, which has reflected from a finger in the vicinity of the biometric object detector, e.g., reflected off of a finger being scanned for a fingerprint image.

It will be understood that in operation the circuit 50 provides a measurement of the reflectivity of the biometric object measured by the amount of the output signal from the photodiode 80 responsive to, e.g., the orange LED being turned on for a period of time and the e.g., yellow LED 70 being turned on for a time, e.g., both for the same amount of time at different time periods within a sampling period. In some embodiments it may be necessary, as shown in FIG. 3, to provide for some signal processing, such as in block 82, between the photodiode 80 and the A/D converter 90. Such signal processing, as is well known in the art, can provide, e.g., suitable filtering and amplification of the output of the photodiode 80 to improve, e.g., the gain and/or dynamic range of the output of the A/D converter, or both.

The absolute values of the amounts of reflected light collected for the, e.g., yellow light emitted by LED 70 and orange light emitted by LED 60 can then be compared in the microprocessor 52 against a selected authenticity threshold. As an example, if the indicated reflectivity of the orange light is more than, e.g., three times that of the yellow light, then the reflecting object is determined to be a human finger, and, if not it is rejected. Thus, difference of the reflections of "spoofing" material A, curve 20, i.e., about 10% or for "spoofing" material B, curve 30, i.e., about 12, each would fail to meet a threshold of, e.g., 1.5×.

Figure 4:
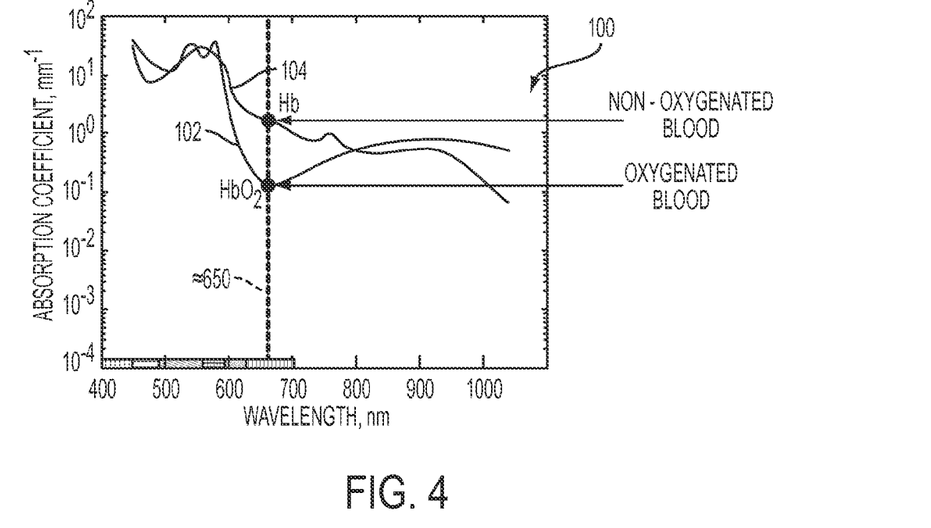
FIG. 4 shows an illustration of absorption varying with wavelength for oxygenated blood and de-oxygenated blood.

FIG. 4 shows an illustration of absorption varying with wavelength for oxygenated blood and de-oxygenated blood. It can be seen that in the range of about yellow to red light, and most prominently within the red band, there is a relatively large difference between the reflectivity of oxygenated blood $HbO_2$, curve 102, and non-oxygenated blood Hb, curve 104. Reflectivity here is the inverse of the illustrated absorption coefficient. Thus, by shining red light on the finger or other part of the body being imaged for a biometric identification, and measuring the reflectivity an output curve 120 from the photodetector, such as 80 in FIG. 3, can be utilized to detect a significant drop in the output, indicating less absorption (i.e., more reflectivity).

Figure 5:
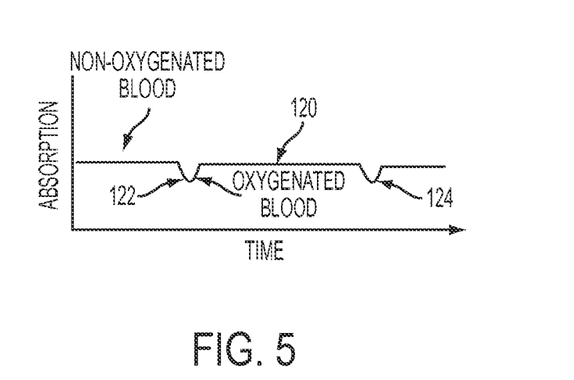
FIG. 5 illustrates a system and method for detecting a pulse from the presence or absence of oxygenated blood.

FIG. 5 illustrates a system and method for detecting a pulse from the presence or absence of oxygenated blood. It will be understood that the biometric image sensor may be operating over too short a time to detect sequential drops in absorption 22 and 124, and therefore measure a pulse rate for the individual. However, the individual could be prompted or otherwise directed to leave the biometric object in place, e.g., keep the finger on the object sensor, and, therefore, have the pulse of the user detected. Alternatively, the user could be prompted or otherwise directed to swipe the object several times, in order to detect at least one change 122, 124 in the photodetector output, as another "anti-spoofing" detector. That is, assuming the usual user has a resting pulse rate of 60, such a change in absorption 122, 124 will occur at a rate of once per second. In the case of a fingerprint image detector utilizing swiping of the finger over a sensor, and assuming that the swipe takes one half a second, on average for every two swipes the detector should see at least the onset or the discontinuance of one such change 122 124. Detecting such a change, i.e., the onset of the indication of the decrease in absorption or the return to the higher level of absorption, i.e., the leading or trailing edges of the respective one of the blips 122, 124 can indicate a change from non-oxygenated blood to oxygenated blood or vice versa, a further indicator that the object being sensed is part of a human body.

Figure 6:
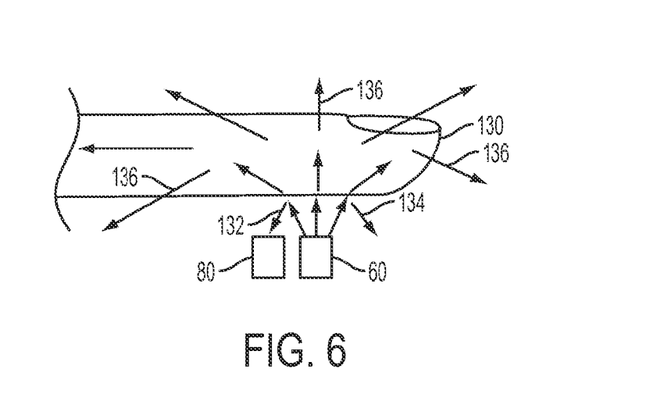
FIG. 6 illustrates schematically the detection of light reflecting from the biogenic object being sensed, such as a human finger.

FIG. 6 illustrates schematically the detection of light reflecting from the biogenic object being sensed, such as a human finger. As can be seen, the photodetector, such as 80 in FIG. 3 should be placed relatively adjacent the respective one or more light sources, illustrated as LED 60, in order to be sensitive to light 132, 134 that is actually reflecting from the biometric object, such as finger 130, as opposed to traveling into the finger 130 and then exiting the finger, such as light 136.

Depending upon the timing of the energization of the LEDs for the anti-snooping, one of the LEDs for the anti-snooping by detection of reflection from human skin may also be utilized for anti-snooping by detection of the periodic presence of oxygenated blood. Also, at least one of the LEDs could be utilized to detect the pulse rate of the user, by having the user maintain the biometric object, such as the finger over the sensor, i.e., not swipe the finger. Applicants' assignee has previously filed applications for waking the sensor from "sleep" when no biometric object has been detected in the vicinity of the sensor for some period of time, as a power saving measure, whereby the biometric object sensor comes out of a sleep mode and begins to detect image portions for assembling an image of all or most of a fingerprint, as is discussed in SYSTEM AND METHOD FOR MINIMIZING POWER CONSUMPTION FOR AN OBJECT SENSOR, U.S. Pat. No. 7,643,950, issued on Jan. 5, 2010, and ULTRA LOW POWER WAKE-ON-EVENT MODE FOR BIOMETRIC SYSTEMS, U.S. Pat. App. Pub. No. 2010/0180136, published on Jul. 15, 2010.

There are many ways to detect the increase in oxygenated blood, i.e., decrease in percentage absorption as illustrated in FIG. 5, representing a human pulse. The photodiode 80 in the circuit 50 of FIG. 3, or a separate photodiode (not shown), can be, as an example, sampled periodically over time, and discharged to ground after each sample. The photodiode 80 can then accumulate photons and be sampled at some regular sample timing period, so as to accumulate an amount of photons up to the next sample time (some photodiodes can be tuned to a given photon wavelength) so as to only respond to reflected light of the given wavelength. As can be seen from the curve of FIG. 5 the samples should be relatively unvariable over most of the period of the sampling, recognizing that some variability may be induced by noise in the system. Photodiodes can be any suitable photosensor or photodetector capable of sensing light or other electromagnetic energy.

However, as the sampling times approach the time of the occurrence of a pulse in the human subject, i.e., the decrease 122 124 in the absorption, due to oxygenated blood in the finger, simply comparing successive samples can detect the change on the leading side of a respective blip 122, 24, a peak of the blip 122, 124 and the return of the trailing edge to the steady state value. Once again, looking at FIG. 5 and assuming that the blip from start to finish occupies about ⅛ of the time between pulses, and also that the pulse is about sixty, then the blip occupies about ⅛ of a second. for a swipe time of one half second, there would be about a 60% chance that the swipe would occur while at least some portion of the blip 122, 124 is occurring, i.e., leading edge, peak and trailing edge, and would, therefore, be detectable. Therefore, on average, if the first swipe fails to detect the blip 122, 124 indicative of the human pulse being present (even though not enough information is gathered to measure pulse rate and such, two swipes or at most three would most likely indicate the presence of a pulse cause by a human heart beat, and, therefore, another anti-spoof indicator.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A biometric image sensor comprising:
   a first light source having a first wavelength $\lambda_1$;
   a second light source having a second wavelength $\lambda_2$;
   a photodetector configured and positioned to receive light of the first wavelength $\lambda_1$ and light of the second wavelength $\lambda_2$ reflecting from a biometric object being imaged and to produce a first reflectivity output indicative of the amount of reflectance of the light of the first wavelength $\lambda_1$ and a second reflectivity output indicative of the amount of reflectance of the light of the second wavelength $\lambda_2$; and
   a computing device configured to compare the difference between the first reflectivity output and the second reflectivity output with an authenticity threshold.

2. The biometric image sensor of claim 1 wherein the biometric object is a finger.

3. The biometric image sensor of claim 2 wherein the finger is being imaged to obtain a fingerprint image.

4. The biometric image sensor of claim 1 wherein the first wavelength $\lambda_1$ and the second wavelength $\lambda_2$ are selected to coincide with a section of relatively high change in a reflectance vs. wavelength curve for the biometric object.

5. The biometric image sensor of claim 2 wherein the first wavelength $\lambda_1$ and the second wavelength $\lambda_2$ are selected to coincide with a section of relatively high change in a reflectance vs. wavelength curve for the biometric object.

6. The biometric image sensor of claim 3 wherein the first wavelength $\lambda_1$ and the second wavelength $\lambda_2$ are selected to coincide with a section of relatively high change in a reflectance vs. wavelength curve for the biometric object.

7. The biometric image sensor of claim 1 wherein the biometric object comprises human skin.

8. The biometric image sensor of claim 2 wherein the biometric object comprises human skin.

9. The biometric image sensor of claim 3 wherein the biometric object comprises human skin.

10. The biometric image sensor of claim 1 wherein the first wavelength $\lambda_1$ is in the visible range of yellow light and the second wavelength $\lambda_2$ is in the visible range of one of orange light and red light.

11. The biometric image sensor of claim 2 wherein the first wavelength $\lambda_1$ is in the visible range of yellow light and the second wavelength $\lambda_2$ is in the visible range of one of orange light and red light.

12. The biometric image sensor of claim 3 wherein the first wavelength $\lambda_1$ is in the visible range of yellow light and the second wavelength $\lambda_2$ is in the visible range of one of orange light and red light.

13. A method of sensing an image of a biometric object comprising:
    directing a first light source having a first wavelength $\lambda_1$ on the object;
    directing a second light source having a second wavelength $\lambda_2$ on the object;

detecting the light of the first wavelength $\lambda_1$ and the light of the second wavelength $\lambda_2$ reflecting from the biometric object being imaged and producing a first reflectivity output indicative of the amount of reflectance of the light of the first wavelength $\lambda_1$ and a second reflectivity output indicative of the amount of reflectance of the light of the second wavelength $\lambda_2$; and comparing, via a computing device, the difference between the first reflectivity output and the second reflectivity output with an authenticity threshold.

14. The method of claim 13 wherein the biometric object is a finger.

15. The method of claim 14 wherein the finger is being imaged to obtain a fingerprint image.

16. The method of claim 13 wherein the first wavelength $\lambda_1$ and the second wavelength $\lambda_2$ are selected to coincide with a section of relatively high change in a reflectance vs. wavelength curve for the biometric object.

17. The method of claim 14 wherein the first wavelength $\lambda_1$ and the second wavelength $\lambda_2$ are selected to coincide with a section of relatively high change in a reflectance vs. wavelength curve for the biometric object.

18. The method of claim 15 wherein the first wavelength $\lambda_1$ and the second wavelength $\lambda_2$ are selected to coincide with a section of relatively high change in a reflectance vs. wavelength curve for the biometric object.

19. The method of claim 13 wherein the biometric object comprises human skin.

20. The method of claim 14 wherein the biometric object comprises human skin.

21. The method of claim 15 wherein the biometric object comprises human skin.

22. The method of claim 13 wherein the first wavelength $\lambda_1$ is in the visible range of yellow light and the second wavelength $\lambda_2$ is in the visible range of one of orange light and red light.

23. The method of claim 14 wherein the first wavelength $\lambda_1$ is in the visible range of yellow light and the second wavelength $\lambda_2$ is in the visible range of one of orange light and red light.

24. The method of claim 15 wherein the first wavelength $\lambda_1$ is in the visible range of yellow light and the second wavelength $\lambda_2$ is in the visible range of one of orange light and red light.

25. A non-transitory machine readable medium storing instructions that, when executed by a computing device, cause the computing device to perform a method, the method comprising:

directing a first light source having a first wavelength $\lambda_1$ on a biometric object being imaged;

directing a second light source having a second wavelength $\lambda_2$ on the biometric object being imaged;

detecting the light of the first wavelength $\lambda_1$ and the light of the second wavelength $\lambda_2$ reflecting from the biometric object being imaged and producing a first reflectivity output indicative of the amount of reflectance of the light of the first wavelength $\lambda_1$ and a second reflectivity output indicative of the amount of reflectance of the light of the second wavelength $\lambda_2$; and comparing the difference between the first reflectivity output and the second reflectivity output with an authenticity threshold.

26. A biometric image sensor comprising:

a light source configurable to emit a first wavelength $\lambda_1$ of light and a second wavelength $\lambda_2$ of light;

a photodetector configurable and positionable to receive one or more electromagnetic radiation wavelengths reflected from a surface in response to the first wavelength $\lambda_1$ and the second wavelength $\lambda_2$ wherein the reflected electromagnetic radiation is reflecting from a biometric object being imaged to produce a first reflectivity output indicative of the amount of reflectance of the light of the first wavelength $\lambda_1$ and a second reflectivity output indicative of the amount of reflectance of the light of the second wavelength $\lambda_2$; and a computing device configured to compare the difference between the first reflectivity output and the second reflectivity output with an authenticity threshold.

27. A method of sensing an image of a biometric object comprising:

directing a first light source having a first wavelength $\lambda_1$ on the object;

directing a second light source having a second wavelength $\lambda_2$ on the object;

detecting one or more electromagnetic radiation wavelengths reflected from a surface in response to the first wavelength $\lambda_1$ and the second wavelength $\lambda_2$ wherein the reflected electromagnetic radiation is reflecting from a biometric object being imaged to produce a first reflectivity output indicative of the amount of reflectance of the light of the first wavelength $\lambda_1$ and a second reflectivity output indicative of the amount of reflectance of the light of the second wavelength $\lambda_2$, and comparing, via a computing device, the difference between the first reflectivity output and the second reflectivity output with an authenticity threshold.

28. A non-transitory machine readable medium storing instructions that, when executed by a computing device, cause the computing device to perform a method, the method comprising:

directing a first light source having a first wavelength $\lambda_1$ on a biometric object being imaged;

directing a second light source having a second wavelength $\lambda_2$ on the biometric object being imaged;

detecting one or more electromagnetic radiation wavelengths reflected from a surface in response to the first wavelength $\lambda_1$ and the second wavelength $\lambda_2$ wherein the reflected electromagnetic radiation is reflecting from a biometric object being imaged to produce a first reflectivity output indicative of the amount of reflectance of the light of the first wavelength $\lambda_1$ and a second reflectivity output indicative of the amount of reflectance of the light of the second wavelength $\lambda_2$, and comparing the difference between the first reflectivity output and the second reflectivity output with an authenticity threshold.

* * * * *